(12) United States Patent  
Hotta

(10) Patent No.: US 12,467,520 B2
(45) Date of Patent: Nov. 11, 2025

(54) ELECTRIC ACTUATOR

(71) Applicant: DENSO CORPORATION, Kariya (JP)

(72) Inventor: Koji Hotta, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/807,508

(22) Filed: Aug. 16, 2024

(65) Prior Publication Data

US 2024/0401677 A1 Dec. 5, 2024

Related U.S. Application Data

(63) Continuation of application No. PCT/JP2023/004349, filed on Feb. 9, 2023.

(30) Foreign Application Priority Data

Feb. 18, 2022 (JP) .................................. 2022-023737

(51) Int. Cl.
| | |
|---|---|
| *F16H 19/08* | (2006.01) |
| *F16H 57/02* | (2012.01) |
| *F16H 57/021* | (2012.01) |
| *F16H 57/031* | (2012.01) |
| *F16H 63/34* | (2006.01) |
| *H02K 5/10* | (2006.01) |

(Continued)

(52) U.S. Cl.
CPC ........... *F16H 19/08* (2013.01); *F16H 57/021* (2013.01); *F16H 57/031* (2013.01); *F16H 63/3466* (2013.01); *H02K 5/10* (2013.01); *H02K 7/1166* (2013.01); *H02K 11/38* (2016.01); *F16H 2057/02026* (2013.01); *F16H 2057/02034* (2013.01); *F16H 2057/02082* (2013.01); *H02K 2211/03* (2013.01)

(58) Field of Classification Search
CPC .................. H02K 7/1166; H02K 5/225; F16H 2057/02034; F16H 2057/0282; F16H 2061/326; F16H 57/031; F16H 63/3466
See application file for complete search history.

(56) References Cited

U.S. PATENT DOCUMENTS

| | | | | |
|---|---|---|---|---|
| 9,525,322 B2 * | 12/2016 | Okabe | .................... | H02K 11/21 |
| 2006/0011012 A1 | 1/2006 | Matsuyama | | |

(Continued)

FOREIGN PATENT DOCUMENTS

| | | | |
|---|---|---|---|
| CN | 111396550 A | * | 7/2020 |
| JP | 2011234453 A | * | 11/2011 |

(Continued)

OTHER PUBLICATIONS

CN-111396550-A machine translation. (Year: 2020).*
JP-2011234453-A machine translation. (Year: 2011).*

*Primary Examiner* — Jake Cook
(74) *Attorney, Agent, or Firm* — Nixon & Vanderhye P.C.

(57) ABSTRACT

An electric actuator includes a motor, a speed reduction mechanism, a board, a housing, and a board cover. The speed reduction mechanism decelerates a rotation of the motor and transmits it to an output shaft. An electronic component related to drive control of the motor is mounted on the board. The housing has a case and a cover, and houses the motor, the speed reduction mechanism, and the board therein. A board cover engages with the case inside the housing and separates the motor and speed reduction mechanism from the board.

8 Claims, 13 Drawing Sheets

(51) Int. Cl.
*H02K 7/116* (2006.01)
*H02K 11/38* (2016.01)

(56) References Cited

U.S. PATENT DOCUMENTS

| | | | |
|---|---|---|---|
| 2013/0313949 | A1 | 11/2013 | Fujii |
| 2015/0075311 | A1 | 3/2015 | Kanzaki |
| 2020/0332890 | A1 | 10/2020 | Kannou et al. |

FOREIGN PATENT DOCUMENTS

| | | |
|---|---|---|
| JP | 2017051064 A | 3/2017 |
| JP | 2017192214 A | 10/2017 |
| JP | 2018-64310 | 4/2018 |
| JP | 2019037114 A | 3/2019 |
| JP | 2019067664 A | 4/2019 |
| JP | 2020092477 A | 6/2020 |

\* cited by examiner

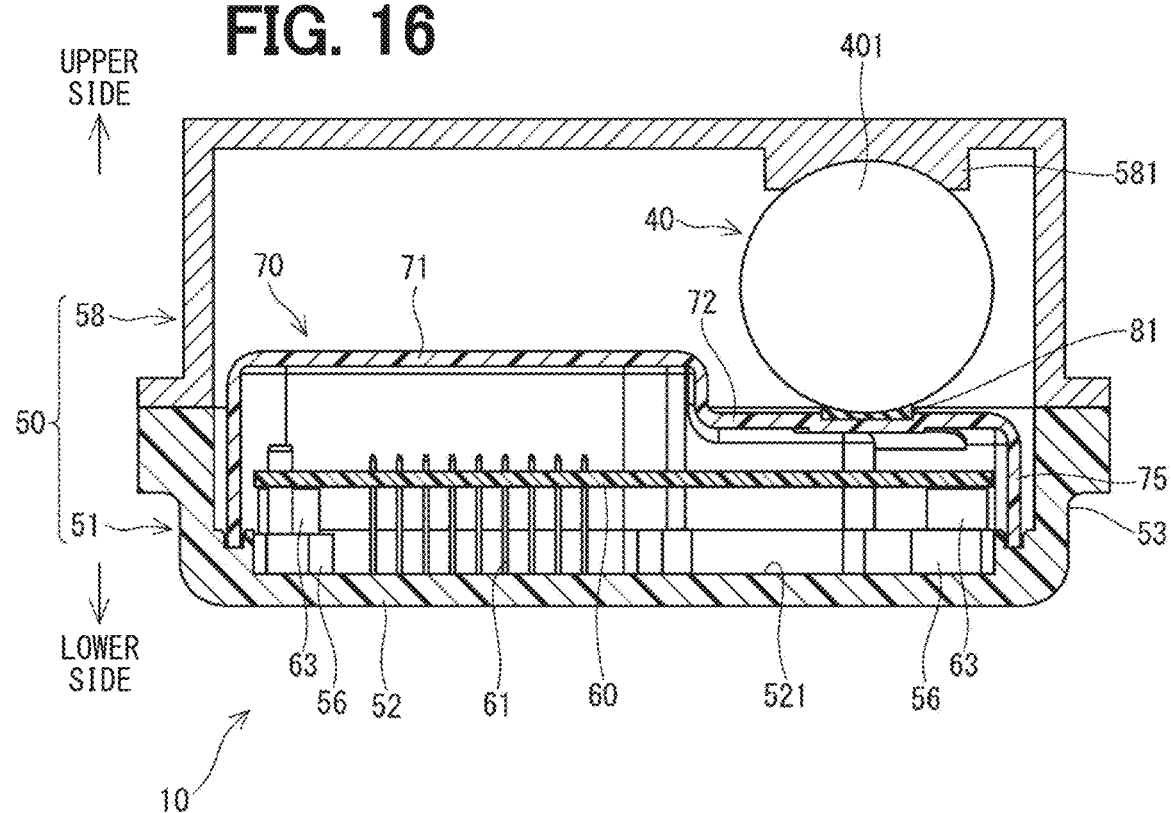
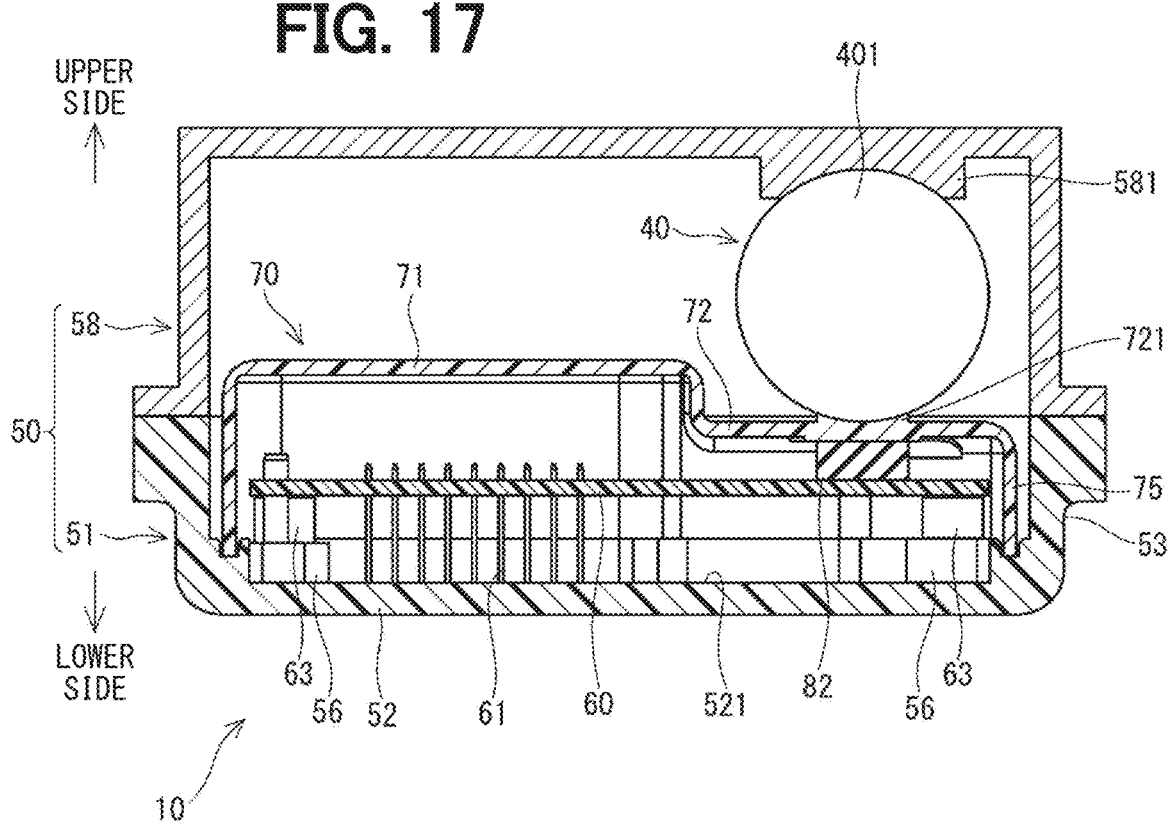

ELECTRIC ACTUATOR

CROSS REFERENCE TO RELATED APPLICATIONS

This application is a continuation application of International Patent Application No. PCT/JP2023/004349 filed on Feb. 9, 2023, which designated the U.S. and based on and claims the benefits of priority of Japanese Patent Application No. 2022-023737 filed on Feb. 18, 2022. The entire disclosure of all of the above applications is incorporated herein by reference.

TECHNICAL FIELD

The present disclosure relates to an electric actuator.

BACKGROUND

Conventionally, a control circuit for controlling a drive of a motor body is integrally assembled with the motor body.

SUMMARY

An object of the present disclosure is to provide an electric actuator that can prevent foreign matter from entering with a simple configuration.

An electric actuator of the present disclosure includes a motor, a speed reduction mechanism, a board, a housing, and a board cover. The speed reduction mechanism decelerates a rotation of the motor and transmits it to an output shaft. On the board, an electronic component related to a drive control of the motor 40 is mounted. The housing has the case and the cover, and houses the motor, the speed reduction mechanism, and the board therein. The board cover engages with the case inside the housing and separates the motor and speed reduction mechanism from the board.

BRIEF DESCRIPTION OF THE DRAWINGS

The above and other objects, features and advantages of the present disclosure will become more apparent from the following detailed description taken in conjunction with the accompanying drawings. In the drawings:

FIG. 16 is a cross-sectional view showing an electric actuator according to a third embodiment;

FIG. 17 is a cross-sectional view showing an electric actuator according to a fourth embodiment.

DETAILED DESCRIPTION

Figure 1:
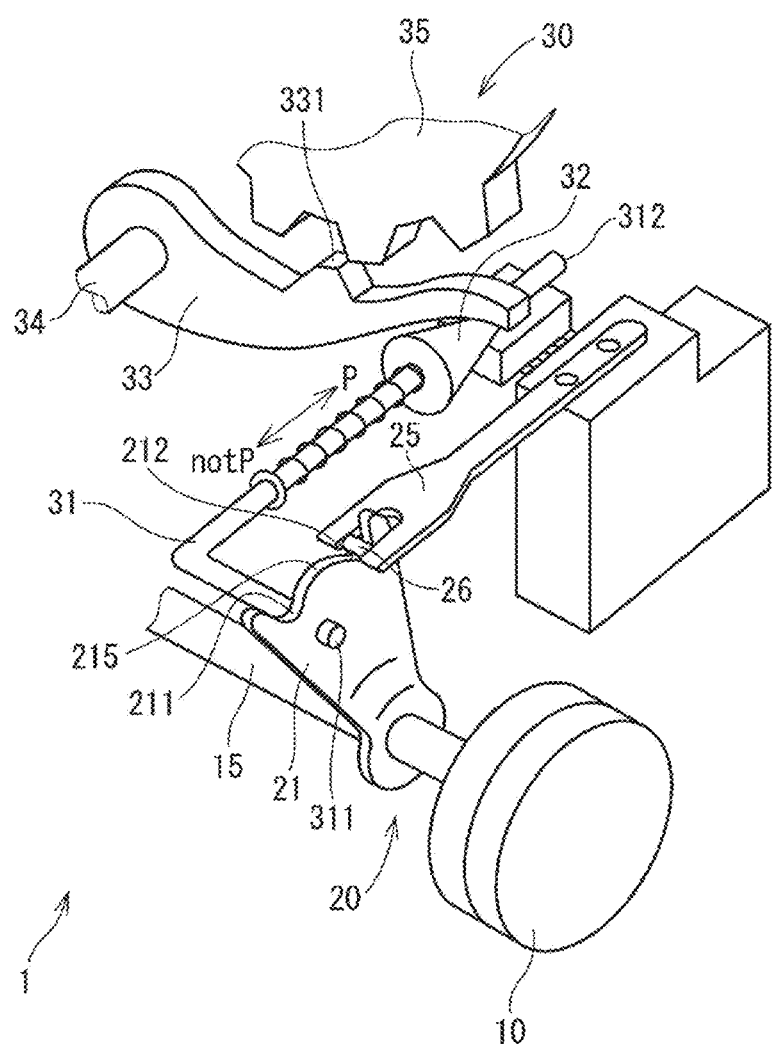
FIG. 1 is a schematic configuration diagram showing a parking lock system according to a first embodiment.

In an assumable example, a control circuit for controlling a drive of a motor body is integrally assembled with the motor body. For example, a circuit board is accommodated in an accommodation recess for the circuit board formed in the end frame.

The circuit board is made into a separate space from the motor by configuring the housing with three members of a motor case, an end frame that accommodates the circuit board, and a motor cover. In this configuration, in order to seal both the motor and the circuit board, sealing structures are required at two locations: the motor case and the end frame, and the end frame and the motor cover. An object of the present disclosure is to provide an electric actuator that can prevent foreign matter from entering with a simple configuration.

An electric actuator of the present disclosure includes a motor, a speed reduction mechanism, a board, a housing, and a board cover. The speed reduction mechanism decelerates a rotation of the motor and transmits it to an output shaft. On the board, an electronic component related to a drive control of the motor 40 is mounted. The housing has the case and the cover, and houses the motor, the speed reduction mechanism, and the board therein. The board cover engages with the case inside the housing and separates the motor and speed reduction mechanism from the board. Therefore, it is possible to prevent foreign matter from entering the board cover with a relatively simple configuration.

Hereinafter, an electric actuator according to the present disclosure will be described with reference to the drawings. In the following plural embodiments, substantially same structural configurations are designated with the same reference numerals thereby to simplify the description.

First Embodiment

A first embodiment is shown in FIG. 1 to FIG. 13. As shown in FIG. 1, an electric actuator 10 is applied to a parking lock system 1. The parking lock system 1 includes an electric actuator 10, a detent mechanism 20 and a parking lock mechanism 30.

The electric actuator 10 is of a rotary type and is composed of, for example, a brushed DC motor, a reduction gear mechanism and the like. The electric actuator 10 functions as a drive source for the detent mechanism 20 by rotating an output shaft 15. Details of the electric actuator 10 will be described later.

The detent mechanism 20 has a detent plate 21, a detent spring 25 and the like, and transmits rotational driving force output from the electric actuator 10 to the parking lock mechanism 30.

The detent plate 21 is fixed to the output shaft 15 and driven by the electric actuator 10. On the detent spring 25 side of the detent plate 21, two valley portions 211 and 212 and a peak portion 215 separating the two valley portions 211 and 212 are provided.

The detent spring 25 is an elastically deformable plate-like member, and is provided with the detent roller 26 at a tip of the detent spring 25. The detent spring 25 urges the detent roller 26 toward a rotation center of the detent plate 21.

When a rotational force equal to or greater than a predetermined force is applied to the detent plate 21, the detent spring 25 is elastically deformed, and the detent roller 26 moves between the valley portions 211 and 212. By fitting the detent roller 26 into one of the two valley portions 211 and 212, the swinging of the detent plate 21 is restricted, and a state of the parking lock mechanism 30 is fixed.

The parking lock mechanism 30 includes a parking rod 31, a conical member 32, a parking lever 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the valley portion 211 corresponding to the P range, the conical member 32 moves in the direction of the arrow P.

The parking lever 33 comes into contact with a conical surface of the conical member 32 and is provided so as to be swingable around the shaft part 34. On the parking gear 35 side of the parking lever 33, a protrusion 331 that can mesh with the parking gear 35 is provided. When the conical member 32 moves in the direction of the arrow P due to the rotation of the detent plate 21, the parking lever 33 is pushed up and the protrusion 331 and the parking gear 35 mesh with each other. On the other hand, when the conical member 32 moves in the direction of the arrow notP, the meshing between the protrusion 331 and the parking gear 35 is released.

The parking gear 35 is connected to a drive shaft (not shown) and provided so as to be able to mesh with a protrusion 331 of the parking lever 33. When the parking gear 35 and the protrusion 331 are engaged with each other, the rotation of the drive shaft is restricted. When the shift range is one of the ranges (not P range) other than the P range, the parking gear 35 is not locked by the parking lever 33. Therefore, the rotation of the drive shaft is not restricted by the parking lock mechanism 30. When the shift range is the P range, the parking gear 35 is locked by the parking lever 33 and the rotation of the drive shaft is restricted.

Figure 2:
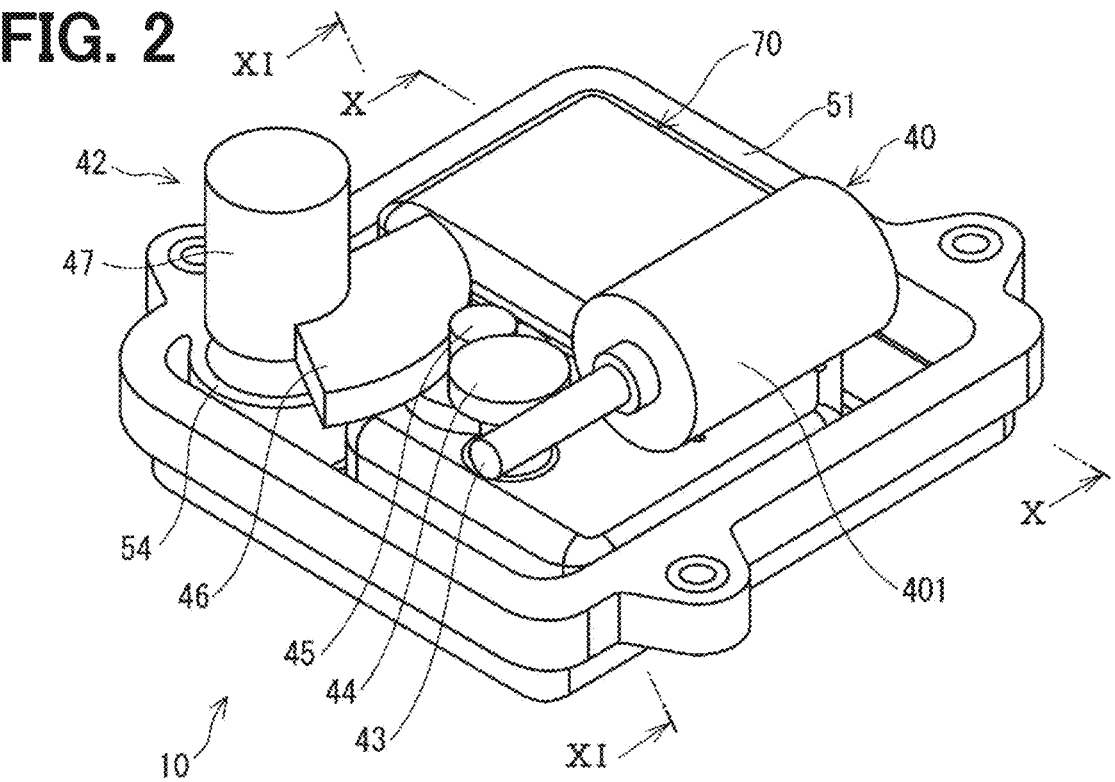
FIG. 2 is a perspective view of the electric actuator with a cover removed according to the first embodiment.

As shown in FIGS. 2 to 11, the electric actuator 10 includes a motor 40, a speed reduction mechanism 42, a housing 50, a board 60, a board cover 70, and the like. As shown in FIG. 2, the motor 40 is placed horizontally on the board cover 70 so that the motor shaft is substantially parallel to a bottom surface of a case 51.

The speed reduction mechanism 42 has a worm gear 43, a helical gear 44, an intermediate gear 45, a driven plate 46 and a driven shaft 47. In the present embodiment, the gears constituting the speed reduction mechanism 42 are made of metal, but at least a portion thereof may be made of resin.

The worm gear 43 rotates together with the motor shaft of the motor 40. The helical gear 44 meshes with the large diameter portions of the worm gear 43 and the intermediate gear 45. The intermediate gear 45 has a large diameter portion and a small diameter portion, the large diameter portion is meshed with the helical gear 44 and the small diameter portion is meshed with the driven plate 46. The helical gear 44 and the intermediate gear 45 are rotatably supported by a cover 58.

The driven plate 46 and the driven shaft 47 are integrally formed. The driven shaft 47 is rotatably supported by the cover 58 and connected to the output shaft 15. Thereby, the rotation of the motor 40 is transmitted to the output shaft 15 via the worm gear 43, the helical gear 44, the intermediate gear 45, the driven plate 46, and the driven shaft 47.

Figure 10:
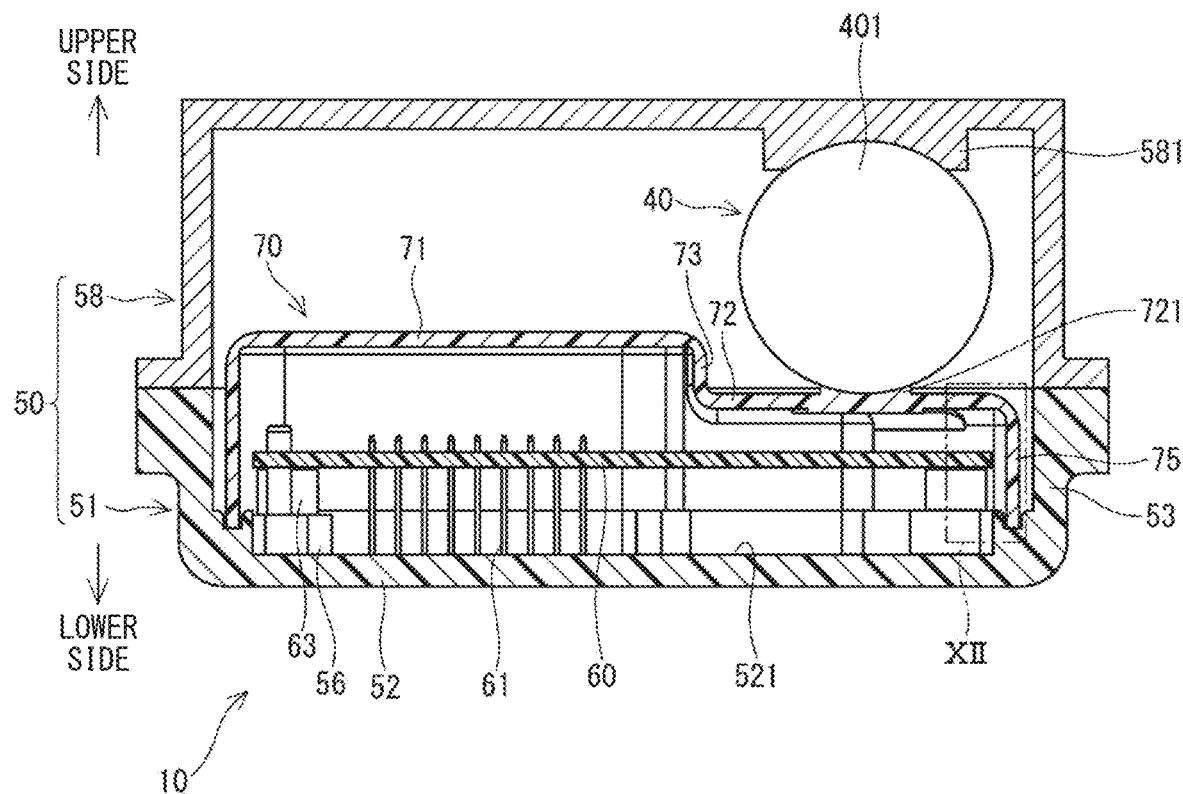
FIG. 10 is a cross-sectional view taken along a line X-X in FIG. 2.

The housing 50 has the case 51 and the cover 58 (see FIG. 10). The case 51 and the cover 58 are fixed with bolts or the like and sealed. The motor 40, the speed reduction mechanism 42, the board 60, and the board cover 70 are housed inside the housing 50. Hereinafter, inside the housing 50, the case 51 side is referred to as a lower side, and the cover 58 side is referred to as an upper side.

Figure 3:
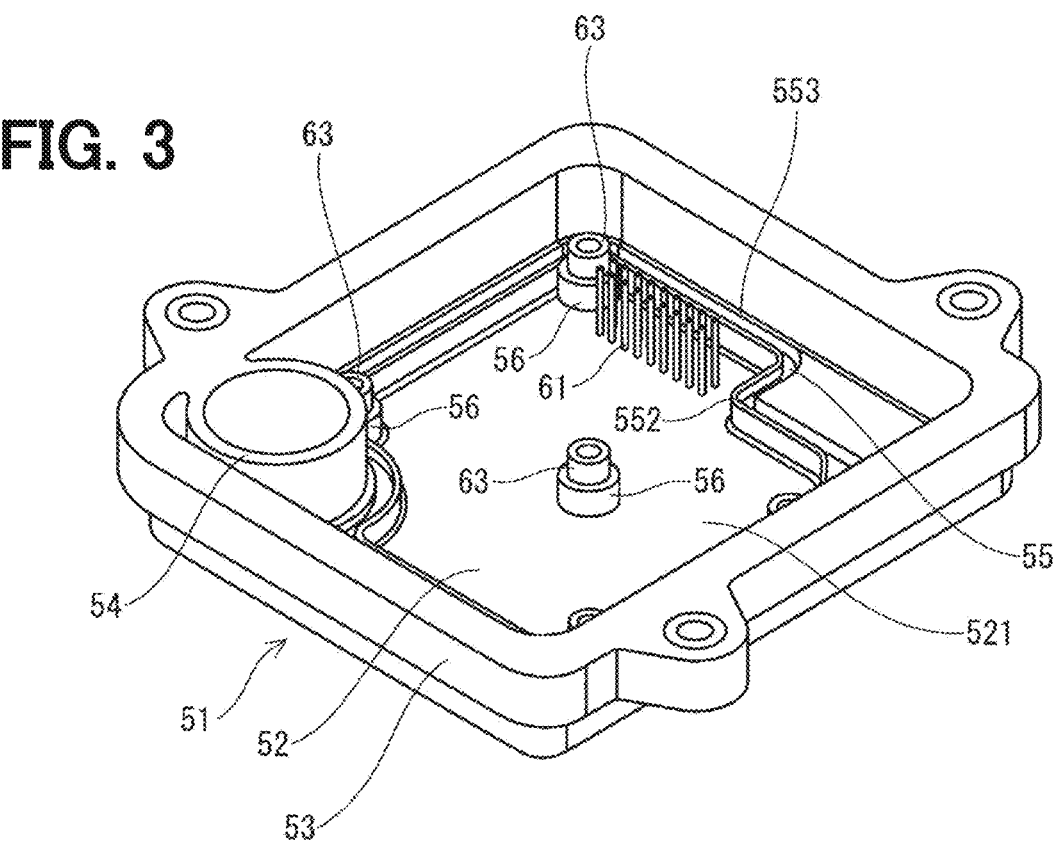
FIG. 3 is a perspective view showing the case according to the first embodiment.
Figure 4:
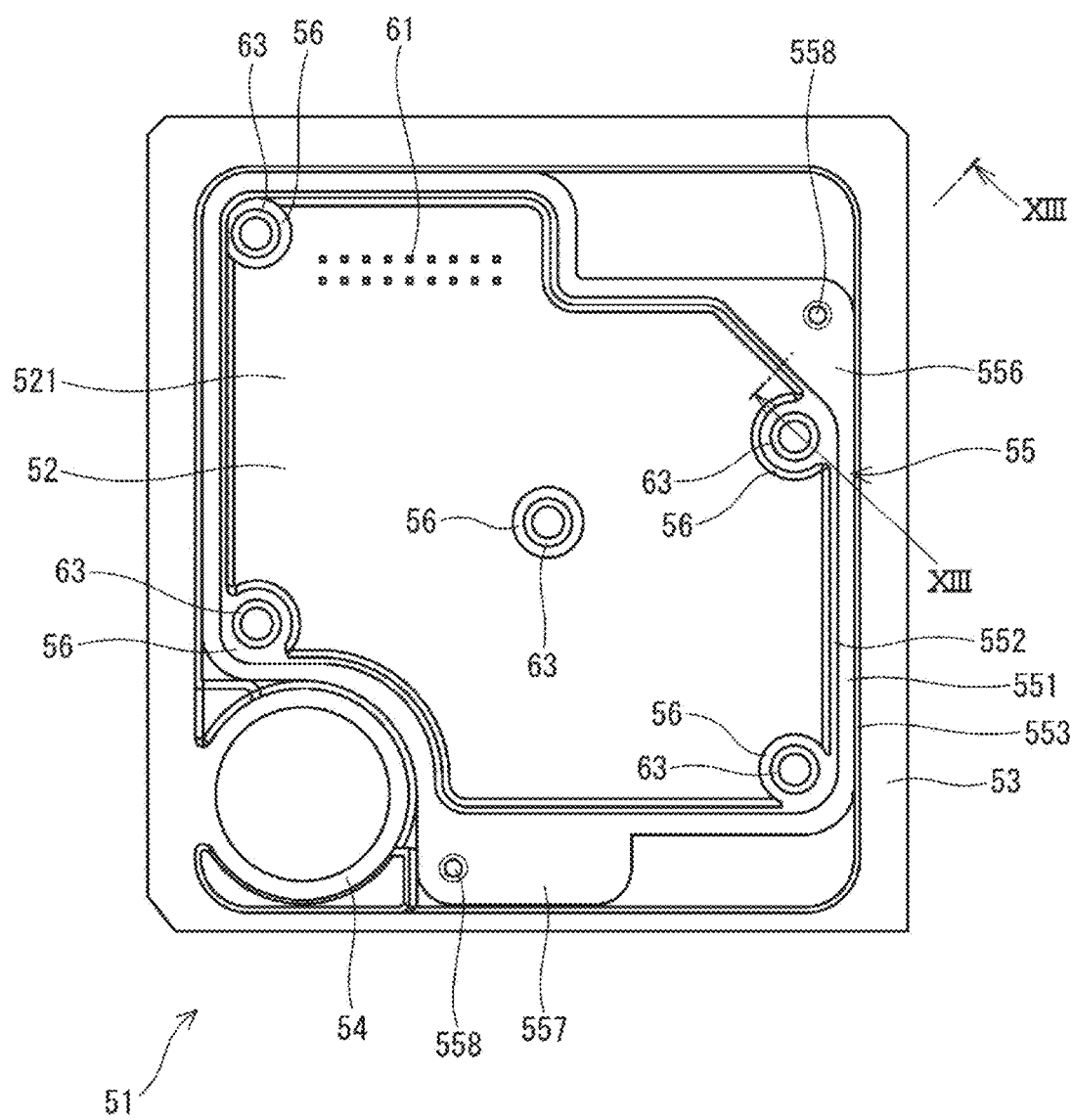
FIG. 4 is a plan view showing the case according to the first embodiment.

As shown in FIGS. 3 and 4, the case 51 is made of, for example, resin. The case 51 has a case bottom 52 and a case peripheral wall 53 erected along an outer edge of the case bottom 52, and is generally rectangular in a plan view. A cylindrical portion 54 is integrally formed in the case 51 at a location corresponding to the driven shaft 47. The cylindrical portion 54 is formed in a cylindrical shape that opens toward the driven shaft 47, and is provided so that the end surface thereof can come into contact with the driven shaft 47. Due to the contact between the driven shaft 47 and the cylindrical portion 54, the load in an axial direction of the driven shaft 47 is applied to the case 51.

A cover insertion groove 55 is formed in the case bottom 52. The cover insertion groove 55 is configured by a bottom surface 551, an inner wall 552 on the case center side, and an outer wall 553 on the case peripheral wall 53 side. The bottom surface 551 is formed to be higher than the board facing surface 521 of the inner wall 552 on the case center side. The cover insertion groove 55 is provided with enlarged portions 556 and 557 in which collar portions 76 and 77 of the board cover 70, which will be described later, are arranged. A pin 558 is provided upright on the enlarged portions 556 and 557.

A board fixing portion 56 is formed on the inner wall 552 at the center of the case. Further, a terminal 61 is molded on the case bottom 52 and has one end protruding from the case bottom 52. The terminals 61 include a motor terminal connected to the motor 40, a sensor terminal used for transmitting and receiving signals from a rotational position sensor, etc. (not shown), and the like.

Figure 5:
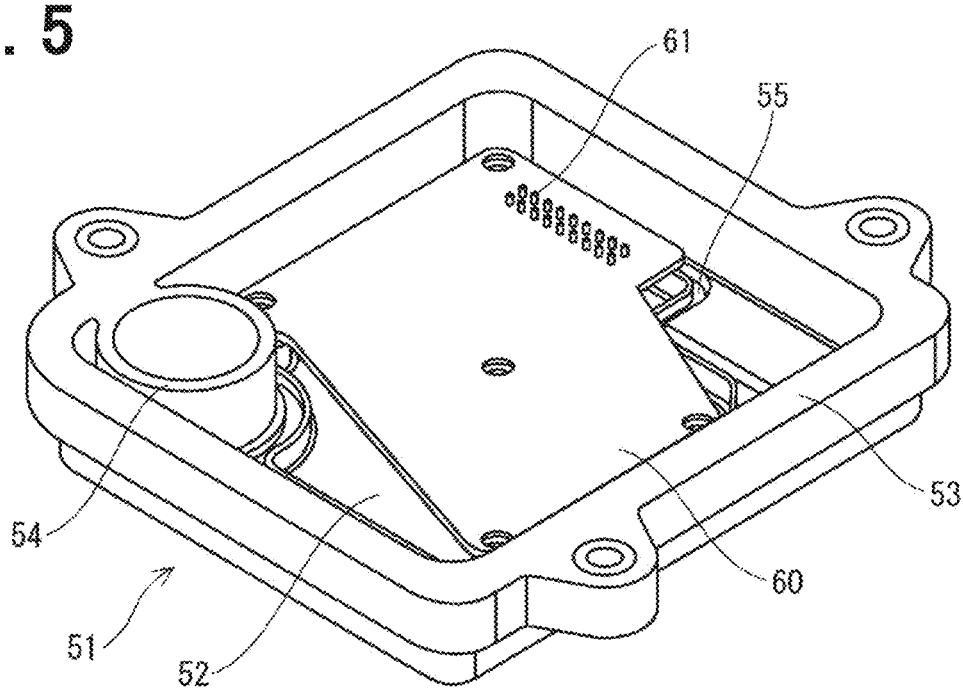
FIG. 5 is a perspective view showing a state in which a board is assembled to the case according to the first embodiment.
Figure 6:
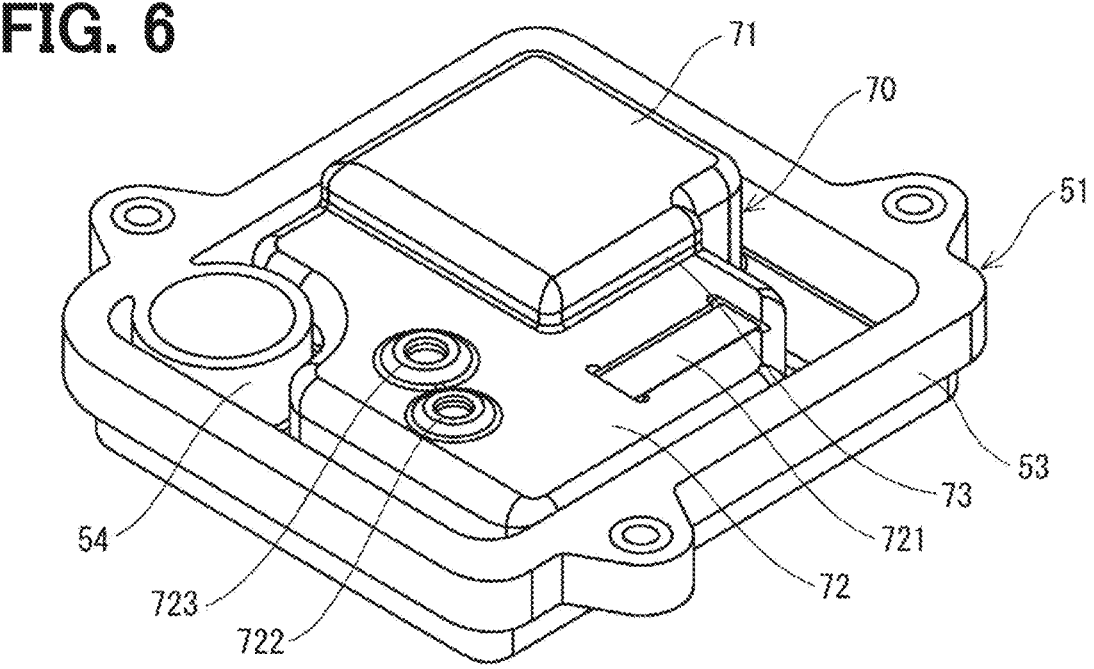
FIG. 6 is a perspective view showing a state in which a board cover is assembled to the case according to the first embodiment.

As shown in FIG. 5, the board 60 is placed on the board fixing portion 56 and fixed to the case 51 by nuts 63 provided on the board fixing portion 56 and bolts (not shown). On the board 60, electronic components such as a microcomputer related to drive control of the motor 40 and switching elements forming a driver circuit are mounted. The board 60 is connected to the terminal 61.

As shown in FIGS. 6 to 9, the board cover 70 has a first bottom portion 71, a second bottom portion 72, a cover peripheral wall 75, and collar portions 76, 77, etc., and they are integrally formed of, for example, resin. The board cover 70 is arranged inside the case peripheral wall 53 and accommodates the board 60 therein. A step 73 is formed so that the second bottom portion 72 is lower than the first bottom portion 71. In the present embodiment, by making the second bottom portion 72, where the motor 40 and the speed reduction mechanism 42 are arranged, lower than the first bottom portion 71, it is possible to reduce the size in a vertical direction of the paper in FIG. 10 and the like. Further, the second bottom portion 72 is formed so as to avoid the cylindrical portion 54.

A motor holding portion 721 and gear supporting portions 722 and 723 are formed on the second bottom portion 72. The motor holding portion 721 is formed in a substantially rectangular shape along the axial direction of the motor 40. As shown in FIG. 10, a motor holding portion 581 is formed on the cover 58, and the motor 40 is held in the housing 50 so that the motor housing 401 is sandwiched between the board cover 70 and the cover 58 from the radial direction. Furthermore, by assembling the cover 58 to the case 51, it can be considered that the cover 58 presses the board cover 70 against the case 51 via the motor 40. In the present embodiment, the case 51, the board 60, the board cover 70, the motor 40, the speed reduction mechanism 42, and the cover 58 are stacked in this order.

Figure 11:
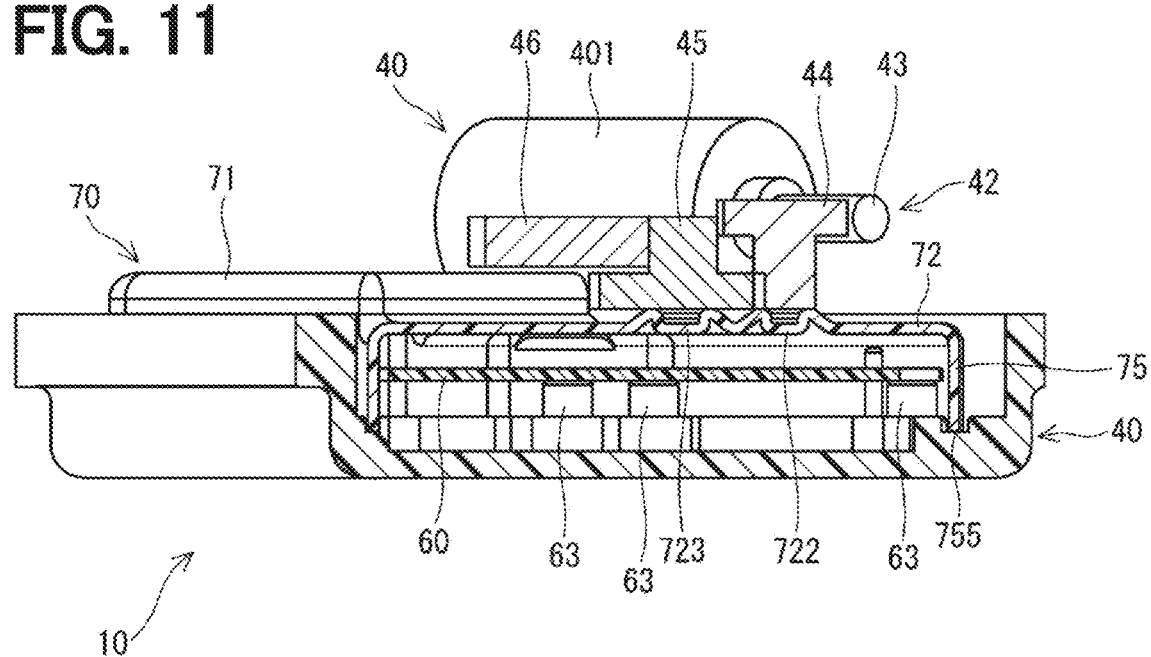
FIG. 11 is a cross-sectional view taken along a line XI-XI of FIG. 2.

As shown in FIG. 11, the gear support portion 722 supports one end of a rotation shaft of the helical gear 44, and the gear support portion 723 supports one end of a rotation shaft of the intermediate gear 45. Thereby, the board cover 70 is configured to receive a load in the axial direction of the helical gear 44 and the intermediate gear 45.

Figure 8:
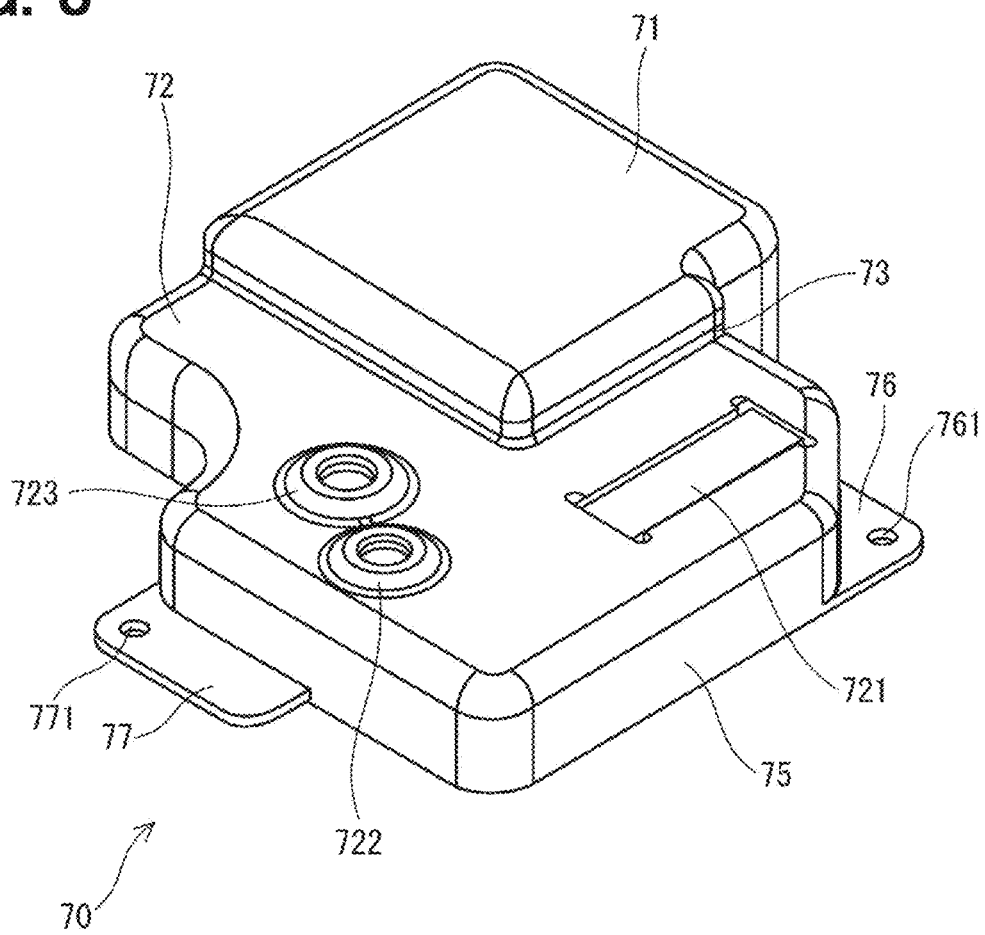
FIG. 8 is a perspective view showing the board cover according to the first embodiment.
Figure 9:
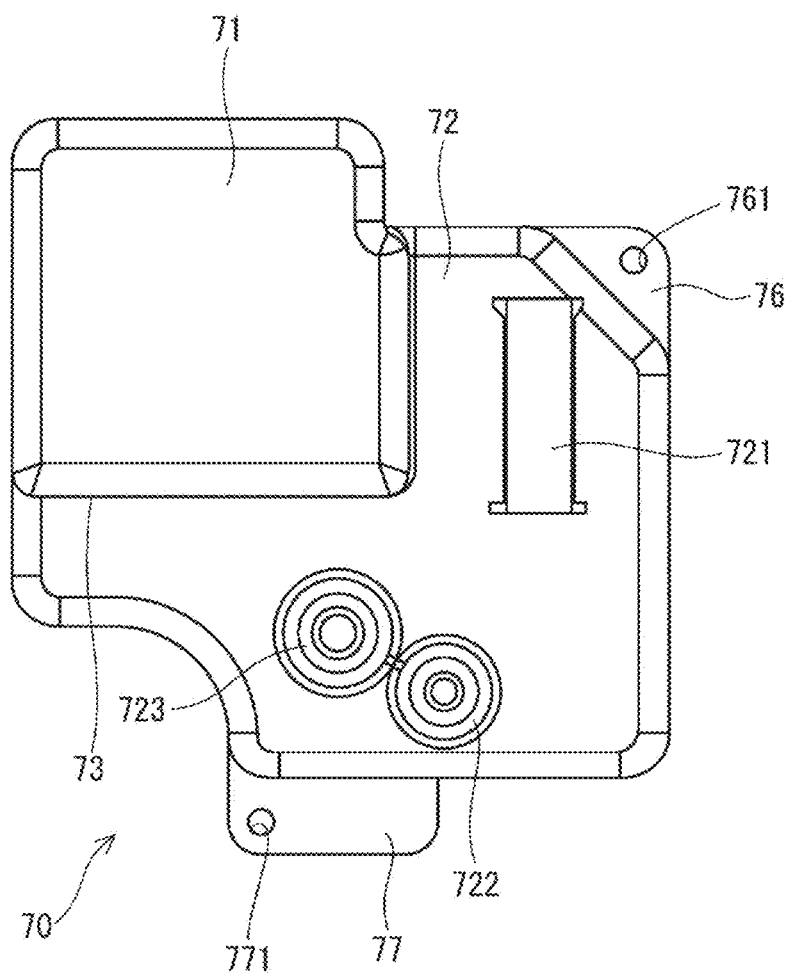
FIG. 9 is a plan view showing the board cover according to the first embodiment.

As shown in FIGS. 8 and 9, the collar portions 76 and 77 extending toward the outer circumference are formed on a distal end side of the cover peripheral wall 75. The distal end side of the cover peripheral wall 75, including the collar portions 76 and 77, is formed to be on the same plane, and is inserted into the cover insertion groove 55. Holes 761 and 771 are formed in the collar portions 76 and 77, respectively. In the present embodiment, two collar portions 76 and 77 are provided, but the number, arrangement, shape, etc. of the collar portions may be different.

Figure 12:
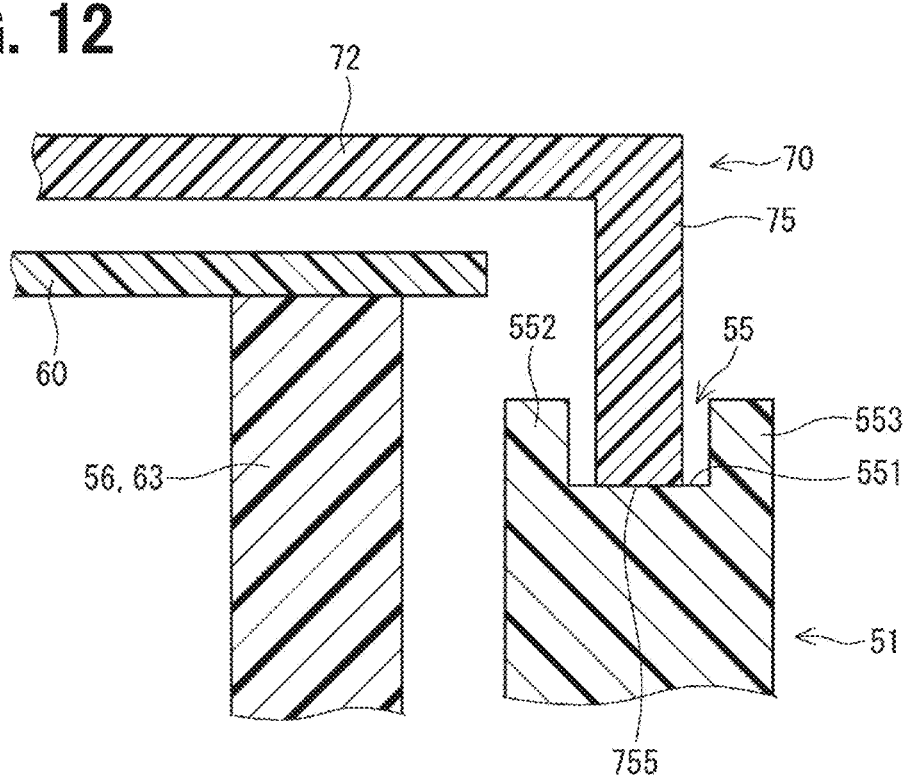
FIG. 12 is a schematic cross-sectional view showing a part XII in FIG. 10.
Figure 13:
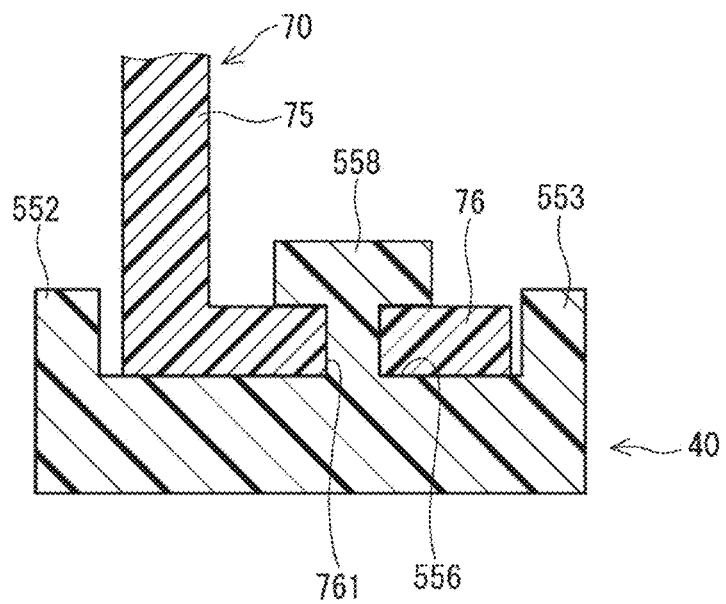
FIG. 13 is a schematic cross-sectional view corresponding to the cross section taken along a line XIII-XIII in FIG. 4.

FIGS. 12 and 13 are schematic cross-sectional views illustrating the assembly relationship between the case 51 and the board cover 70. As shown in FIGS. 12 and 13, the distal end surface 755 of the cover peripheral wall 75 comes into contact with the bottom surface 551 of the cover insertion groove 55 so as to form a so-called labyrinth structure. Hereinafter, a contact surface between the distal end surface 755 of the cover peripheral wall 75 and the bottom surface 551 of the cover insertion groove 55 will be referred to as a labyrinth contact surface.

In the present embodiment, the motor 40, the speed reduction mechanism 42, and the board 60 are housed in the same housing 50. Therefore, by providing the board cover 70 inside the housing 50, abrasion particles generated by the motor 40 and the speed reduction mechanism 42 are prevented from entering the board 60 side.

In the present embodiment, the assembly portion between the case 51 and the board cover 70 has the labyrinth structure, and foreign matter from outside the board cover 70 is prevented from entering at the labyrinth contact surface. Thereby, a sealing member such as an adhesive for sealing the case 51 and the board cover 70 can be omitted.

Further, in the present embodiment, the board 60 is provided above the cover insertion groove 55. For example, in a case where the electric actuator 10 is mounted on a vehicle with the cover 58 side facing upward in the vertical direction, even if the foreign matter enters the inside of the board cover 70 from the labyrinth contact surface and climbs over the inner wall 552, the foreign matter falls vertically downward, that is, on the opposite side from the board 60, and can be prevented from reaching the board 60. When the electric actuator 10 is mounted upside down, the labyrinth contact surface is vertically above the opening of the cover insertion groove 55, so there is a low possibility that the foreign matter will go against gravity and reach the labyrinth contact surface.

Figure 7:
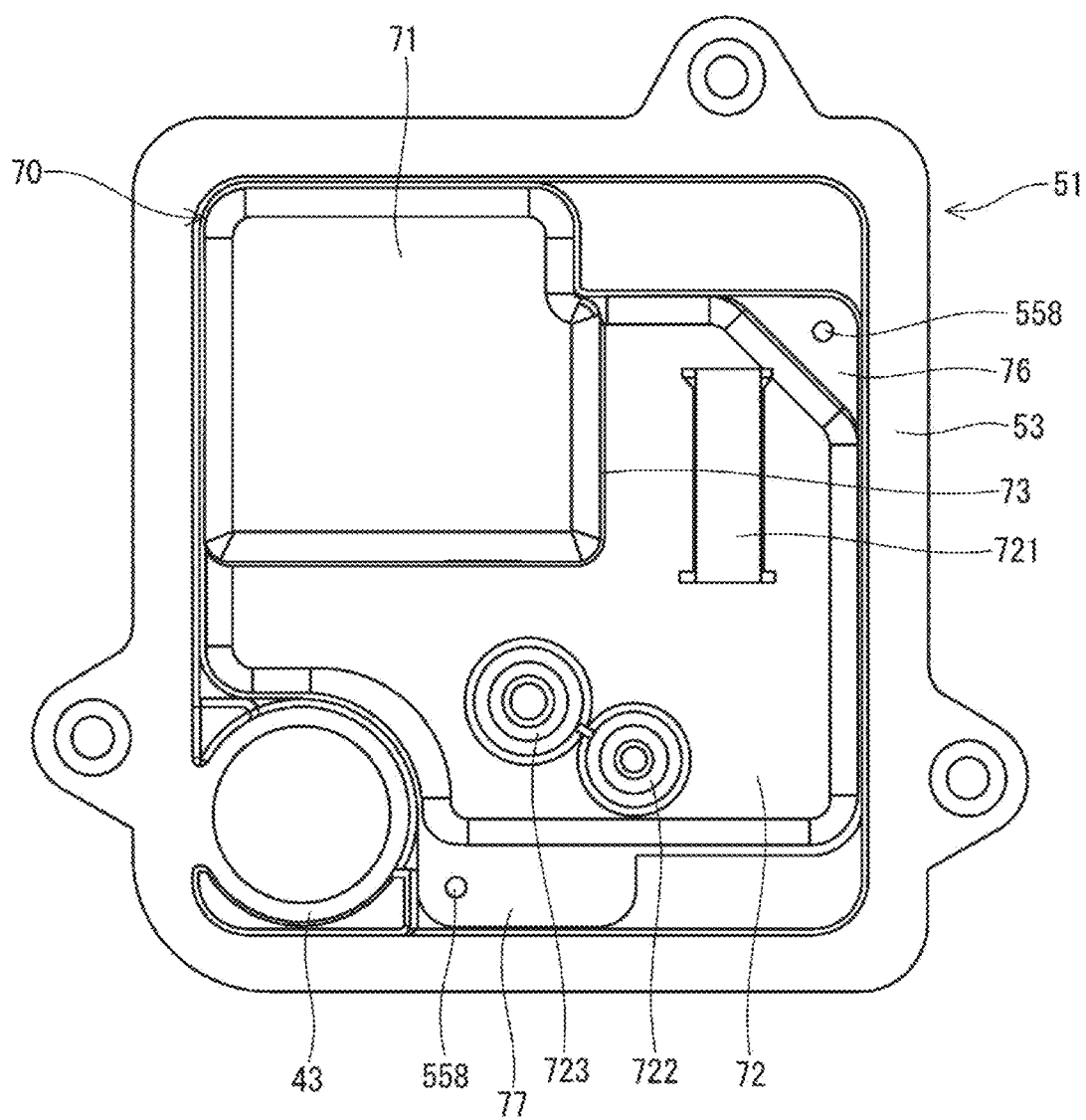
FIG. 7 is a plan view showing a state in which the board cover is assembled to the case according to the first embodiment.

As shown in FIGS. 7 and 13, pins 558 are inserted into holes 761 and 771 formed in the collar portions 76 and 77, and the board cover 70 is fixed to the case 51 by heat caulking or the like. In the present embodiment, the board cover fixing surface, which is the surface pressed by the pin 558, and the labyrinth contact surface are formed on the same plane. Thereby, it is possible to eliminate a gap at the contact portion between the case 51 and the board cover 70, and it is possible to suppress the intrusion of foreign matter.

As described above, the electric actuator 10 includes the motor 40, the speed reduction mechanism 42, the board 60, the housing 50, and the board cover 70. The speed reduction mechanism 42 decelerates the rotation of the motor 40 and transmits it to the output shaft 15. On the board 60, electronic components related to drive control of the motor 40 are mounted. The housing 50 has the case 51 and the cover 58, and houses the motor 40, the speed reduction mechanism 42, and the board 60 therein. The board 60 is housed inside the board cover 70, and the board cover 70 engages with the case 51 inside the housing 50 to separate the motor 40 and the speed reduction mechanism 42 from the board 60.

By providing the board cover 70 inside the housing 50, since the number of sealing locations can be limited to one location between the case 51 and the cover 58, the configuration of the housing 50 can be simplified. Further, it is possible to prevent foreign matter such as abrasion powder generated from the motor 40 and the speed reduction mechanism 42 from reaching the board 60 and causing an abnormality such as a short-circuit failure.

The board cover 70 has bottom portions 71 and 72 and a cover peripheral wall 75. The case 51 is formed with the cover insertion groove 55 into which the distal end side of the cover peripheral wall 75 is inserted. The cover insertion groove 55 is formed by the bottom surface 551 that contacts the distal end surface 755 of the cover peripheral wall 75, an inner wall 552 formed on the inner peripheral side of the bottom surface, and an outer wall 553 that faces the inner wall 552 and is formed on the outer peripheral side of the bottom surface 551. Since the bottom surface 551 of the cover insertion groove 55 and the distal end surface 751 of the cover peripheral wall 75 come into contact with each other, a so-called labyrinth structure is formed. Even if the case 51 and the board cover 70 are not completely sealed, the foreign matter can be prevented from entering the board cover 70.

The board 60 is arranged closer to the bottom portions 71 and 72 than the cover insertion groove 55 is. In other words, the board 60 is arranged above the cover insertion groove 55 in the plane of the paper in FIG. 10 and the like. As a result, when the motor 40 and the speed reduction mechanism 42 are mounted vertically above the board 60, even if the foreign matter should intrude into the inside of the board cover 70, the foreign matter can be prevented from reaching the board 60 side.

The board cover 70 has the collar portions 76 and 77 whose distal ends extend toward the outer periphery on the same plane as the distal end surface 755. The enlarged portions 556 and 557 are formed in the cover insertion groove 55 so as to correspond to the collar portions 76 and 77, and in which the inner wall 552 and the outer wall 553 are separated from other parts. The case 51 and the board cover 70 are fixed at the contact points between the collar portions 76 and 77 and the enlarged portions 556 and 557. By configuring the fixing surface between the case 51 and the board cover 70 to be on the same plane as the labyrinth contact surface, it is possible to prevent a gap from forming between the case 51 and the board cover 70, and to prevent the intrusion of the foreign matter into the inside of the board cover 70.

The motor housing 401 of the motor 40 is sandwiched between the board cover 70 and the cover 58 from the radial direction. Thereby, radial vibration of the motor 40 can be suppressed. In addition, by pressing the board cover 70 in the direction of insertion into the cover insertion groove 55 by the cover 58 via the motor housing 401, the board cover 70 can be biased so that no gap is formed on the labyrinth contact surface without separately providing a fixing structure such as a screw.

Gear support portions 722 and 723 that support the shafts of the helical gear 44 and the intermediate gear 45, which are at least one gear constituting the speed reduction mechanism 42, are formed on the board cover 70. Thereby, the size can be reduced compared to the case where the structure for receiving the axial load of the gears 44 and 45 is provided as a separate member.

The motor 40 drives the parking lock mechanism 30. Thereby, the configuration of the electric actuator 10 related to driving the parking lock mechanism 30 can be simplified.

Second Embodiment

Figure 14:
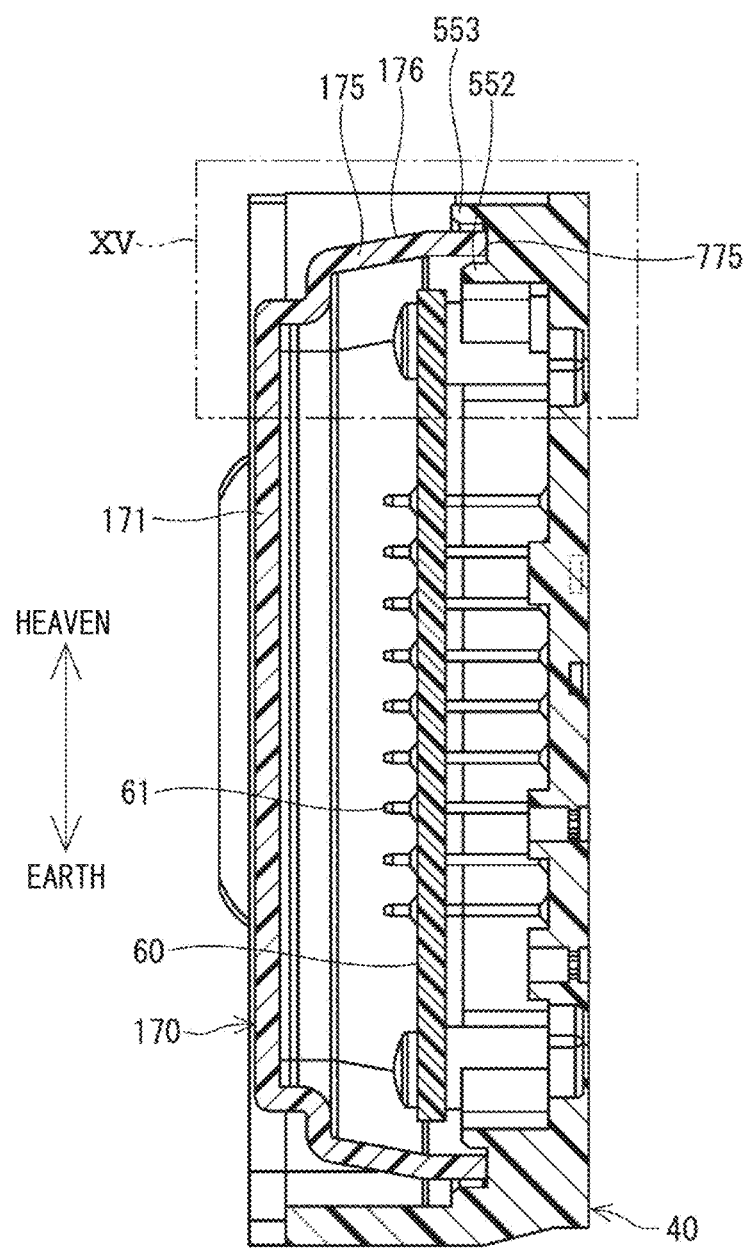
FIG. 14 is a cross-sectional view showing an electric actuator according to a second embodiment.
Figure 15:
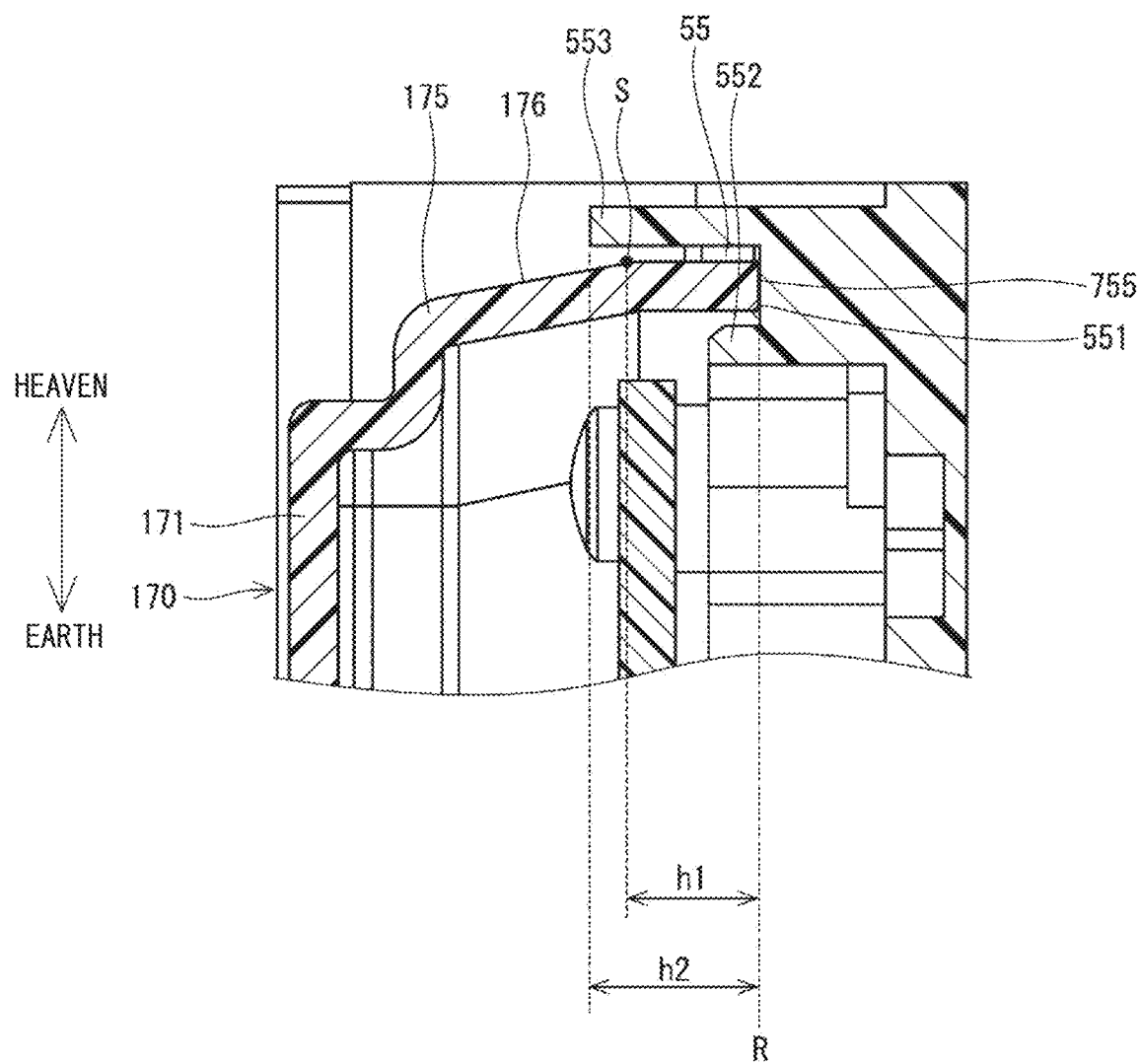
FIG. 15 is a cross-sectional view showing a part XV in FIG. 14.

A second embodiment is shown in FIGS. 14 and 15. In the present embodiment, the board cover 170 is different from the configuration in the above embodiment, so the different point will be mainly explained. The board cover 170 has a bottom portion 171 and a cover peripheral wall 175. The distal end side of the cover peripheral wall 175 is inserted into the cover insertion groove 55. This embodiment is similar to the embodiment described above in that a labyrinth structure is formed by abutting a distal end surface 775 and the bottom surface 551 of the cover insertion groove 55.

The cover peripheral wall 175 has an inclined portion 176 that is inclined from the outer wall 553 side to the inner wall 552 side. An inclination starting point S of the inclined portion 176 is located closer to the labyrinth contact surface than the end surface of the outer wall 553. That is, when a height of the inclination starting point S from the labyrinth contact surface is defined as h1, and a height of the outer wall 553 from the labyrinth contact surface is defined as h2, h2 is larger than h1 (h2>h1). In addition, in FIG. 15, a position of the labyrinth contact surface is described as "R".

When the electric actuator 10 is mounted on a vehicle with the height direction perpendicular to the vertical direction, the foreign matter falling from the upper side in the vertical direction will move away from the labyrinth contact surface along the inclined portion 176. Thereby, the foreign matter can be prevented from entering the inside of the board cover 70 regardless of the mounting direction of the electric actuator 10. In FIGS. 14 and 15, the upper side in the vertical direction is defined as "heaven", and the lower side in the vertical direction is defined as "earth".

In the present embodiment, the cover peripheral wall 175 has the inclined portion 176 that inclines from the outer wall 553 side to the inner wall 552 side. The inclination starting point S of the inclined portion 176 is closer to the bottom surface 551 than the end surface of the outer wall 553. As a result, even if the electric actuator 10 is mounted with the labyrinth structure on one side facing upward in the vertical direction, the foreign matter that has fallen onto the board cover 70 slides down the inclined portion 176 in the direction of gravity and moves away from the labyrinth contact surface. With this configuration, it is possible to prevent foreign matter from entering the inside of the board cover 70 regardless of the mounting direction. In addition, the same effects as those of the above embodiment can be obtained.

Third Embodiment

A third embodiment is shown in FIG. 16. Although FIG. 16 shows the board cover 70 of the first embodiment, the board cover 170 of the second embodiment may be used instead of the board cover 70. The same applies to a fourth embodiment and a fifth embodiment.

In the third embodiment, an elastic member 81 is provided between the motor 40 and the board cover 70. Thereby, a vibration of the motor 40 in the radial direction can be suppressed. Further, since the board cover 70 can be held down from above, the distal end surface 755 of the board cover 70 can be appropriately brought into contact with the bottom surface 551 of the cover insertion groove 55. As a result, the configuration can be simplified compared to, for example, a case where a fixing structure such as a screw for pressing the board cover 70 against the case 51 is provided. Although the elastic member 81 is provided separately here, the board cover 70 itself may be configured to have elasticity.

In the present embodiment, the elastic member 81 is provided between the motor 40 and the board cover 70. As a result, positional variations between the motor 40 and the board cover 70 are absorbed, the motor 40 can be properly held. It is possible to prevent a gap from being formed between the distal end surface 755 of the board cover 70 and the bottom surface 551 of the cover insertion groove 55. In addition, the same effects as those of the above embodiment can be obtained.

Fourth and Fifth Embodiments

Figure 18:
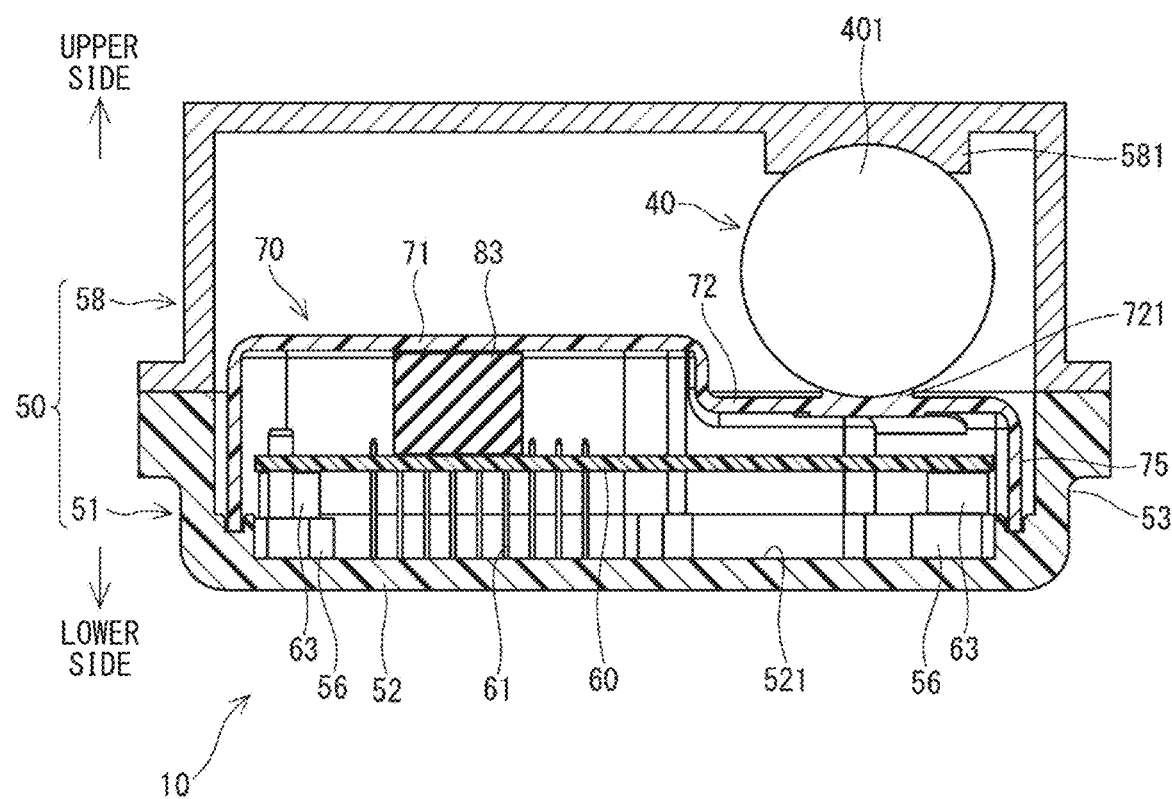
FIG. 18 is a cross-sectional view showing an electric actuator according to a fifth embodiment.

A fourth embodiment is shown in FIG. 17, and a fifth embodiment is shown in FIG. 18. In the fourth embodiment and the fifth embodiment, the elastic members 82 and 83 are provided between the board 60 and the board cover 70. In the fourth embodiment, the elastic member 82 is provided between the board 60 and the second bottom portion 72, and in the fifth embodiment, the elastic member 83 is provided between the board 60 and the first bottom portion 71. The number and location of the elastic members are arbitrary. By providing the elastic members 82 and 38 between the board 60 and the board cover 70, vibration of the board 60 can be suppressed. In addition, the same effects as those of the above embodiment can be obtained.

In the present embodiment, the first bottom portion 71, the second bottom portion 72, and the bottom portion 171 correspond to "bottom portion", the cover peripheral walls 75 and 175 correspond to "peripheral wall", and the elastic member 81 corresponds to the "motor holding elastic member", the elastic members 82 and 83 correspond to "board holding elastic member".

Other Embodiments

In the above embodiments, the speed reduction mechanism is composed of a worm gear, a helical gear, an intermediate gear, and the like. In other embodiments, the configuration of the speed reduction mechanism and the number of speed reduction stages may differ from those of the above embodiments. For example, in the present embodiment described above, the helical gear and the intermediate gear are rotatably supported by the cover. In other embodiments, the gears constituting the reduction gear may be configured to be rotatably supported by the case or the board cover. Further, in the above embodiments, the driven plate and the driven shaft are formed integrally, but in other embodiments, they may be formed separately. In the embodiments described above, the board is fixed to the case with bolts or the like. In other embodiments, fixing members and fixing methods other than bolts may be used to fix the board to the case, such as heat caulking or the like.

In the above embodiments, the case and the board cover are fixed by heat caulking. In other embodiments, the case and the board cover may be fixed by a method other than heat caulking, and the fixing method, fixing location, etc. can be arbitrarily set. In the above embodiments, a step is provided at the bottom of the board cover. In other embodiments, the bottom of the board cover may not have a step.

In the above embodiments, the motor is a brushed DC motor. In another embodiment, the motor may be other than a brushed DC motor. According to the embodiments described above, the two valley portions are formed in the detent plate. As another embodiment, the number of the valley portions is not limited to two and may be three or more. The configuration of the detent mechanism and the parking lock mechanism or the like may be different from those in the embodiments described above.

In the above embodiments, the electric actuator is applied to a parking lock system. In other embodiments, the electric actuator may be applied to in-vehicle systems other than parking lock systems or drive systems other than in-vehicle systems. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. An electric actuator, comprising:
a motor;
a speed reduction mechanism configured to decelerate a rotation of the motor and transmit it to an output shaft;
a board on which an electronic component related to a drive control of the motor is mounted;
a housing having a case and a cover and being configured to house the motor, the speed reduction mechanism, and the board therein; and
a board cover that is separate from the housing, engages with the case inside the housing, and separates the motor and the speed reduction mechanism from the board; wherein:
the board cover has a bottom portion and a peripheral wall,
the case has a cover insertion groove into which a distal end side of the peripheral wall is inserted, and which is composed of a bottom surface in contact with the distal end surface of the peripheral wall, an inner wall formed on an inner circumferential side of the bottom surface, and an outer wall formed on an outer circumferential side of the bottom surface so as to face the inner wall, and
the board cover has a collar portion whose distal end side extends toward an outer periphery on a same plane as the distal end surface,
the cover insertion groove is formed with an enlarged portion corresponding to the collar portion, and
the case and the board cover are fixed at a contact point between the collar portion and the enlarged portion.

2. The electric actuator according to claim 1, wherein the board is arranged closer to the bottom portion than the cover insertion groove.

3. An electric actuator comprising:
a motor;
a speed reduction mechanism configured to decelerate a rotation of the motor and transmit it to an output shaft;
a board on which an electronic component related to a drive control of the motor is mounted;
a housing having a case and a cover and being configured to house the motor, the speed reduction mechanism, and the board therein; and
a board cover that is separate from the housing, engages with the case inside the housing, and separates the motor and the speed reduction mechanism from the board; wherein:
the board cover has a bottom portion and a peripheral wall,
the case has a cover insertion groove into which a distal end side of the peripheral wall is inserted, and which is composed of a bottom surface in contact with the distal end surface of the peripheral wall, an inner wall formed on an inner circumferential side of the bottom surface, and an outer wall formed on an outer circumferential side of the bottom surface so as to face the inner wall,
the peripheral wall has an inclined portion that inclines from the outer wall side to the inner wall side, and
an inclination starting point of the inclined portion is closer to the bottom surface than an end surface of the outer wall.

4. An electric actuator, comprising:
a motor;
a speed reduction mechanism configured to decelerate a rotation of the motor and transmit it to an output shaft;
a board on which an electronic component related to a drive control of the motor is mounted;
a housing having a case and a cover and being configured to house the motor, the speed reduction mechanism, and the board therein; and
a board cover that is separate from the housing, engages with the case inside the housing, and separates the motor and the speed reduction mechanism from the board; wherein:
the motor has a motor housing sandwiched between the board cover and the cover from a radial direction.

5. The electric actuator according to claim 4, wherein a motor holding elastic member is provided between the motor and the board cover.

6. An electric actuator, comprising:
a motor;
a speed reduction mechanism configured to decelerate a rotation of the motor and transmit it to an output shaft;
a board on which an electronic component related to a drive control of the motor is mounted;
a housing having a case and a cover and being configured to house the motor, the speed reduction mechanism, and the board therein; and a board cover that is separate from the housing, engages with the case inside the housing, and separates the motor and the speed reduction mechanism from the board; wherein:

the board cover is formed with a gear support portion that supports a shaft portion of at least one gear constituting the speed reduction mechanism.

7. The electric actuator according to claim 1, wherein a board holding elastic member is provided between the board and the board cover.

8. The electric actuator according to claim 1, wherein the motor drives a parking lock mechanism.

\* \* \* \* \*